Nov. 14, 1939.  J. H. COHEN  2,179,686
COMBINED RHEOSTAT AND SWITCH
Filed April 27, 1934

INVENTOR
BY Joseph H. Cohen
ATTORNEY

Nov. 14, 1939.  J. H. COHEN  2,179,686
COMBINED RHEOSTAT AND SWITCH
Filed April 27, 1934  2 Sheets-Sheet 2
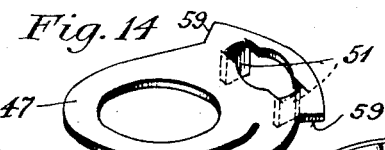
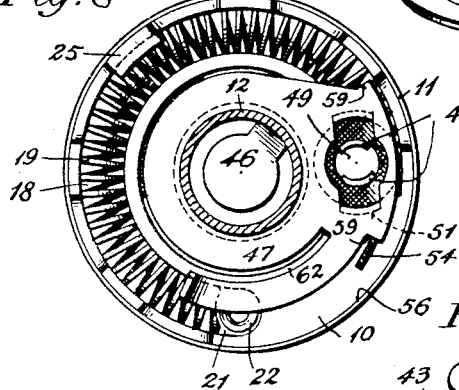
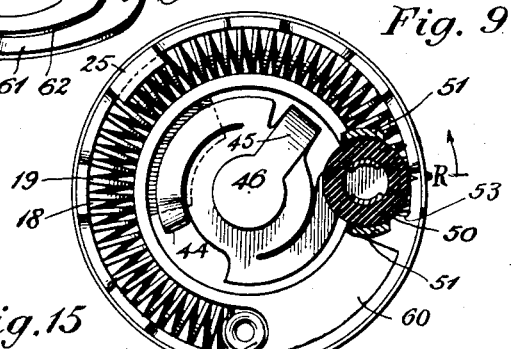
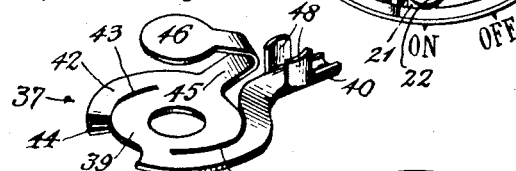
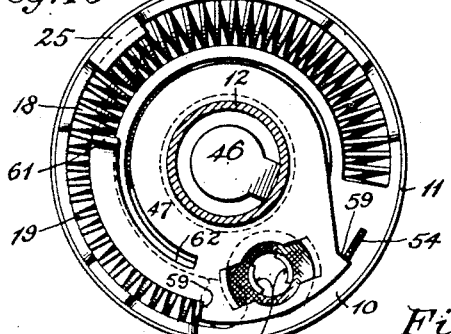
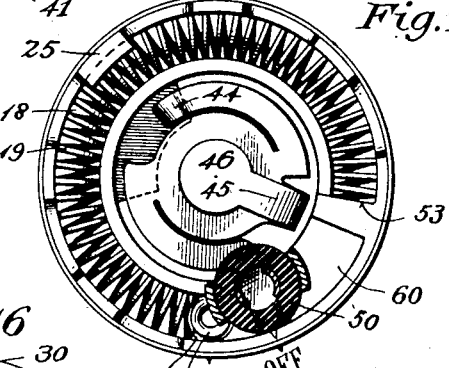
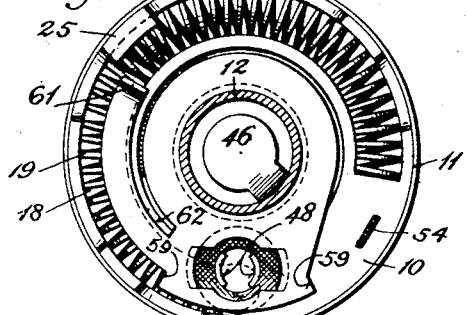
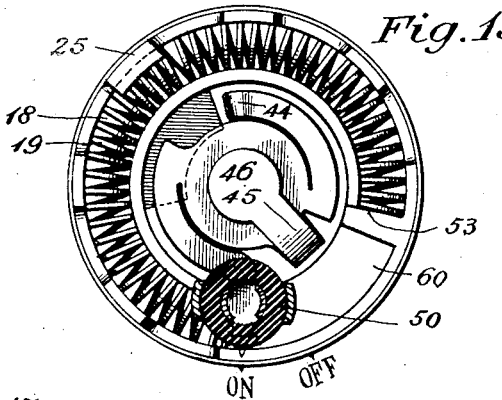
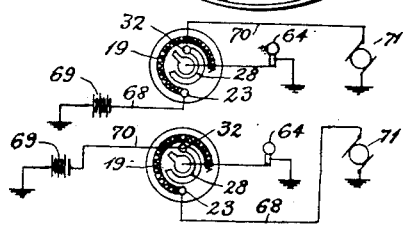
INVENTOR
Joseph H. Cohen
BY
ATTORNEY Patented Nov. 14, 1939

2,179,686

UNITED STATES PATENT OFFICE 2,179,686

COMBINED RHEOSTAT AND SWITCH

Joseph H. Cohen, Bridgeport, Conn., assignor to Casco Products Corporation, Bridgeport, Conn., a corporation of Connecticut Application April 27, 1934, Serial No. 722,700

14 Claims. (Cl. 201—55)

This invention relates to rheostats, and more particularly, to those designed for use with battery currents of relatively low voltage to regulate the speed of fans, etc., in motor vehicles and the like.

An object of this invention is to provide a simple and small rheostat which is sturdy and strong in construction and yet which can be manufactured economically, and lends itself well to quantity production.

Another object of this invention is to provide a rheostat of the kind referred to in which the resistance wire is kept relatively cool during the operation of the device, and to this end the base and casing are so constructed as to have cross ventilation and draught openings located back of the coil to cause currents of air to pass upwardly through the coil and out of the casing.

Another object of this invention is to provide a combined rheostat and switch with means for indicating the condition of the switch.

A feature of this invention is the provision of a pilot light for the rheostat so connected to the wire terminals on the device and the resistance wire and its sliding contact that the device may be connected in two ways to perform its functions differently. When the wires from the motor and battery are connected in one way, the pilot light is caused to glow at full intensity immediately upon the closing of the circuit through the rheostat. When connected the other way, the intensity of the light is greater when there is less resistance and when the motor is turning faster, and the light becomes dimmer as the rheostat is operated to cut down the speed of the motor.

Another feature of the invention is the provision of a single movable contact member which not only serves as a switch to connect the device to one side of a source of current but also serves as a brush for riding on the resistance; and, besides, is provided with a contact for engagement with the pilot light.

Another feature of this invention is the provision of an improved and simple insulating driving connection between the hand operated member and the resistance wire contact or brush, which connection is easily made or completed when the assembled base and casing portions of the device are brought together, even though the connection is substantially enclosed and made inaccessible for hand engagement by the casing.

Another and equally important feature of this invention is the arrangement whereby when the rheostat is in "off" position, not only has the brush, which rides on the coil resistance wire, passed beyond or out of engagement with said wire, but the brush itself becomes completely electrically disconnected from both the current supply and motor circuit.

Other features and advantages will hereinafter appear.

In the accompanying drawings, which illustrate one form of my invention, that at present preferred Figure 1 is a front elevation of my improved combined rheostat and switch.

Fig. 8 is a view like Fig. 3, but showing the parts in the positions they assume when the full resistance is being employed.

Fig. 9 is a view like Fig. 4, but showing the parts in the positions shown in Fig. 8.

Fig. 10 is a view like Fig. 8, but showing the parts in the positions which they assume when the handle or knob is thrown to "off" position.

Fig. 11 is a view like Fig. 9, but showing the parts in the positions shown in Fig. 10.

Fig. 12 is a view like Figs. 8 and 10, but showing the parts in the positions they assume when the switch is thrown to full "on" or high speed position.

Fig. 13 is a view like Figs. 9 and 11, but showing the parts in the position shown in Fig. 12.

Fig. 14 is a perspective view of the driving member which is connected to the handle or knob.

Fig. 15 is a perspective view of the single contact member of the present invention which performs several functions.

Fig. 16 is a view of the segment engaged by the brush.

Fig. 17 is a diagrammatic view showing the way in which the device is connected to the motor and battery so as to cause the pilot light to vary in intensity with relation to the amount of current cut in or out of the circuit by the rheostat.

Fig. 18 is a similar diagram, showing the way the device is wired when it is desired to have the pilot light glow at full intensity, regardless of the position of the sliding contact on the resistance wire so long as the device is passing current.

Figure 1:
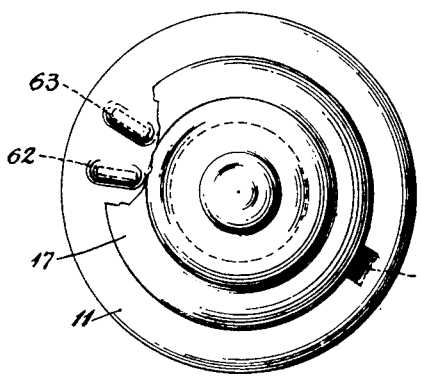

As shown in the accompanying drawings, the device of the present invention comprises a base 10 and a casing 11, the latter having a tubular portion or neck 12 secured to it and adapted to pass through an aperture in an instrument board or supporting plate or bracket 13 to which it is anchored by a lock nut 14. Within the neck 12, there is rotatably mounted a sleeve 15 to which is secured, as by threads 16, a knob or handle 17, the rotation of which causes the combined switch and rheostat of the present invention to connect or disconnect a motor or other current consuming device with a source of current supply.

The base 10 is preferably made of Bakelite, or other suitable insulating material, and is provided with an arcuate semicircular channel 18 in which is supported a resistance wire 19 helically wound and bent arcuately to lie in the channel. At one end of the channel there is provided an overhanging portion 20 to receive one end of the resistance wire coil, and at the other end of the channel there is a step 21 having an aperture through which a tubular rivet 22 extends.

One end of the resistance wire 18 is fastened under the head of the rivet 22, and the top surface of the head of the rivet 22 is made to lie substantially flush with the top edges of the convolutions of the resistance wire coil 19 for reasons appearing below. The rivet 22 extends through the base 10 and at its back end is headed over on a wire terminal piece 23 having a binding screw 24 adapted to be connected to a wire leading to the motor or to the battery. The terminal 23 is angular in form and has its base portion lying in a depression in the back of the base so as to be held against turning.

Thus it will be seen that opposite ends of the resistance wire coil are held in place on the base by the tubular rivet 22 and the overhanging portion 20 respectively. Intermediate these two points the base is provided with an overhanging ledge 25 which prevents the coil 19 from springing upwardly out of its channel 18. To provide these overhanging portions with simple molding dies, there are slots 26 in the base opening at the back through which the plugs forming the overhangs may be withdrawn in making the part.

As above pointed out, the movable contact or brush of the device of the present invention is not always connected to a source of current. For the purpose of conducting current to the brush, there is provided in a central circular cavity 27 in the front face of the base, a contact disk 28 shown in perspective in Fig. 16. This contact disk has a segment cut out to form a gap or interruption 29, and is provided with an aperture 30 through which a tubular rivet 31 passes. The margin of the aperture 30 is countersunk and the base under it is depressed so that the head of the tubular rivet may lie in the plane of the plate 28.

The tubular rivet 31 extends through the base, and at its rear end passes through and is headed over a wire terminal piece 32 having a binding screw 33 which, like the binding screw 24, may be connected to a line leading either to the motor or to the battery. The terminal piece 32 also is angular in form, and its base is located in a depression in the back of the base member 10 to keep it from turning after the end of the rivet is headed over it to securely fasten it in place.

The contact plate 28 has a central aperture 34 through which extends a stud 35, the head 36 of which forms a bearing for the multi-function contact member 37 of the present invention shown in perspective in Fig. 15. There is an insulating washer 38 between the plate 28 and a circular portion 39 of the contact member 37 to space the head 36 of the stud 35 when the latter has its rear end riveted over, and thus allow free rotating movement of the contact member 37 about the axis of the head of the stud.

The contact member 37 is so constructed that it may be made of a flat piece of suitable material such as bronze from a single stamping properly shaped and formed. It has a brush portion 40 separated from its central annular portion by an arcuate cut 41 providing a long arm biased to yieldingly engage a resistance coil 19. The contact member 37 has a switch blade 42 separated from the annular portion 39 by an arcuate cut 43 and has its end bent down at 44 to engage and rub upon the contact disk 28. The contact member 37 has an arm 45 bent over upon itself and provided at its end with a contact 46 to yieldingly engage the pilot light contact as hereinafter explained.

The base 10 with the resistance coil 19, wire terminals 23 and 32, contact disk 28, stud 35, insulating disk 38 and contact member 37, form a subassembly which is attached as a unit to the casing 11 and the parts carried by the latter.

To operate the contact member 37 by the handle or knob 17, the sleeve 15 is provided with a plate 47 shown in perspective in Fig. 14. This plate is riveted to the sleeve 15 and lies over the contact member 37.

Figure 2:
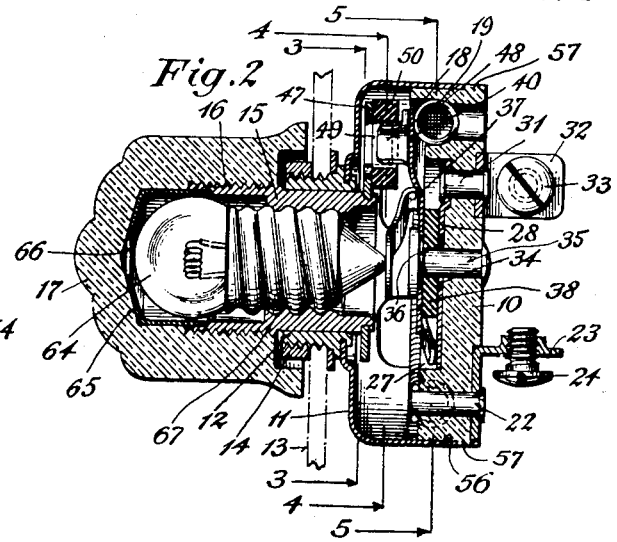
Fig. 2 is a longitudinal section, taken diametrically through the switch.
Figure 3:
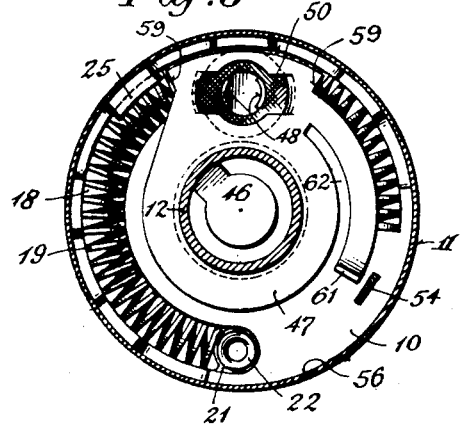
Fig. 3 is a vertical section, taken on the line 3—3 of Fig. 1.
Figure 4:
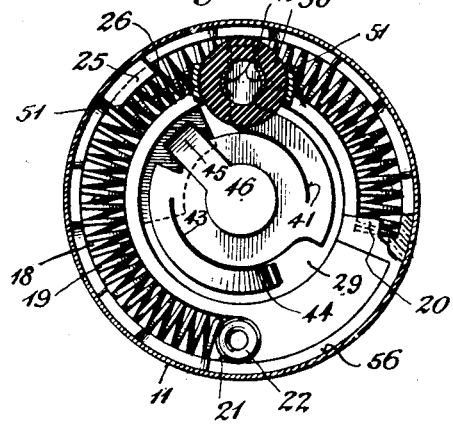
Fig. 4 is a similar view, taken on the line 4—4 of Fig. 1.
Figure 6:
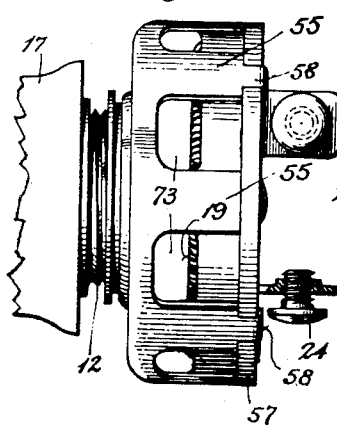
Fig. 6 is a side elevation of the device of the present invention, with the handle portion broken away.
Figure 7:
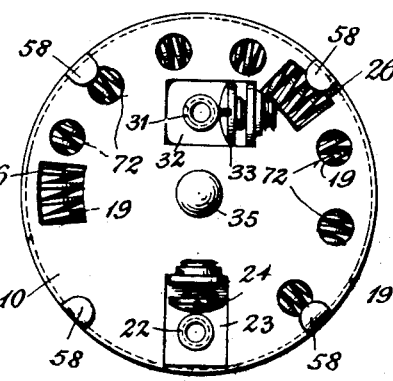
Fig. 7 is a back view of the device.
Figure 5:
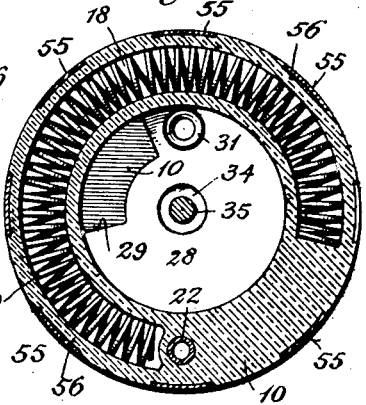
Fig. 5 is also a sectional view, but is taken on the line 5—5 of Fig. 1.

According to the present invention, the driving plate 47 is coupled with the contact member 37 through an insulating member and in such a way that the preassembled base and casing may be slipped together easily and conveniently and, at the same time, connect the driving member 47 and the contact member 37. To accomplish this, the contact member 37 carries on the brush 40 a pair of upstanding segmental arms 48. These arms fit within an aperture 49 in an insulating washer or annulus 50, but, as shown in Fig. 2, the arms do not reach the opposite side of the washer. The driving member 47 is provided with a pair of downwardly extending arms 51, and these fit over the outside or periphery 52 of the washer 50 but do not reach the opposite face of the washer. Of course, either set of arms may be located inside or outside the washer as may be desired.

Thus it will be seen that the washer 50 forms a coupling member between the driving plate 47 and the contact member 37, and, at the same time insulates these parts from each other.

In assembling the device, the washer 50 may be placed either over the arms 48 on the contact member or the arms 51 on the driving plate. Either set of arms will frictionally grip the washer when both the contact member and the driving plate are arranged in predetermined positions, for instance, the position shown in Figs. 8 and 9 where the contact member 37 engages a stop shoulder 53 on the base and the driving arm engages a stop lug 54 on the casing. Then the casing is slipped over the base causing the other set of arms or fingers to engage the washer.

The casing 11 is provided with a plurality of arms 55 sliding over a reduced portion 56 of the base until a flange 57 thereon is engaged, thereby limiting the movement of the casing and base toward each other. Several of these arms 55, alternate arms in the form of the invention shown, are provided with lugs which extend through grooves in the flange 57 and are bent over to engage the back surface of the base.

Thus, after separately assembling the base and casing and sliding the two parts together, bending over of the lugs 58 locks the parts in assembled relation.

Rotation of the knob 17, sleeve 15, and driving member 47 in either direction moves with it the contact member 37. To limit the movement of the contact member and driving plate, the latter is provided with stop shoulders 59 located in position to engage opposite edges of the stop lug 54 above referred to which is struck down from the casing 11, as shown in Fig. 1. When the knob 17 and driving plate 47 are rotated clockwise as shown in the accompanying drawings, the stop lug 54 arrests the movement of the parts when the brush 40 reaches the end of the resistance coil 19, and in this condition the full resistance is in the circuit. When rotated in a counterclockwise direction, the stop lug 54 arrests the movement of the parts in the positions shown in Figs. 10 and 11, where the brush 40 has moved beyond the end of the resistance coil and lies on a platform 60 on the insulating base.

To hold the movable parts in "off" position shown in Figs. 10 and 11 against accidental or casual displacement, the driving member 47 is provided with a detent arm 61 formed integral with the driving member and separated therefrom by an arcuate cut 62 so as to be resilient. The arm 61 is biased to move upwardly, and in "off" position engages a depression 62 (see Fig. 1) in the casing 11. When the knob and moving parts are moved clockwise from the positions shown in Figs. 10 and 11 to those shown in Figs. 12 and 13 where the brush 40 rests upon the hollow rivet 22 and full current is passing through the device, the detent arm 61 engages a depression 63 in the casing and is held in this full "on" position against casual displacement.

In order to indicate the condition of the rheostat and switch, the present invention provides a pilot light in the form of a lamp 64 located in the knob 17, at least a portion of which is made transparent so that light emanating from the lamp 64 may be seen by the operator. According to the present invention, the entire knob 17 is made of translucent material so as to glow when light emanating from the lamp 64 impinges thereon. To control the intensity of the glow and keep it to a point where it is not annoying or does not interfere with the operator of the car to which it is attached, the knob 17 which is made hollow to receive the lamp 64, is provided with a cup-like shield 65 of metal or other opaque material, the bottom of which is provided with an aperture 66 of a size depending upon the quantity of light it is desired to emit. When the material of which the knob 17 is made is translucent, the light passing through the aperture 66 will impinge upon the material of the knob and cause not only the portion adjacent the aperture to glow but practically the entire front of the knob, for the light is transmitted through the material of the body. To hold the lamp, the sleeve 15 may be provided with internal screw threads 67 and the lamp may have the usual screw-threaded base.

According to the present invention, current is conducted to the lamp through the casing or neck 12 from the dashboard or other metal piece 13 to which the device is attached, which part 13 is grounded on the vehicle and thus connected to the grounded side of the battery. The central contact 68 of the lamp is yieldingly engaged by the contact 46 of the contact member 37 and current is conducted to the lamp through these contacts from the ungrounded side of the battery when the switch is "on."

In order that the lamp and the motor which the rheostat controls may be completely electrically disconnected from the source of current when the device is in the "off" position shown in Figs. 10 and 11, the switch of the present invention is so arranged that not only is the brush 40 removed from the resistance coil 19 and rivet 22, but the contact 44 is completely disengaged from the contact plate 28 as shown in Fig. 11. In this way, regardless of whether the device is connected up to give a constant glowing pilot light or one of varying intensity depending upon the position of the rheostat, the lamp will be disconnected when the switch is in "off" position, with the stop shoulder 59 on the driving plate in contact with the stop lug 54 as shown in Fig. 10.

When the handle is rotated clockwise, the contact member is moved so that the brush 40 engages the hollow rivet 22. At the same time, the contact 42 moves to position to engage the contact plate 28 as shown in Fig. 13. At this time, the detent finger 61 is located in the depression 63 and holds the switch in full "on" position against casual or unintentional movement. The contact 42 remains in engagement with the contact plate 28 until the counterclockwise movement of the parts again brings it into the cut-out or interruption 29 in the plate.

As shown in Figs. 17 and 18, the device may be connected up in two ways. In Fig. 17, the terminal member 23 is connected by a wire 68 to a battery 69, the other side of which is grounded, and the terminal piece 32 is connected by a wire 70 to a motor 71, the other side of which is also grounded. With the parts so connected, current from the battery will pass to the lamp 64 through the ground with full voltage only at the time that the contact member 37 is in engagement with the tubular rivet of the terminal member 23, and further movement of the contact member 37 will carry the latter onto the resistance coil 19 with the result that less current will flow to the motor 71 and to the lamp. Accordingly, the lamp will glow less brilliantly as additional convolutions of the resistance wire 19 are cut into the circuit and the speed of the motor decreased.

With the arrangement shown in Fig. 18, the terminal piece 32 connected to the contact plate 28 is connected by its wire 70 to the battery 69 while the wire 68 connected to the terminal piece 23 is connected to the motor 71. Thus, when the contact member 37 to which the lamp 64 is permanently connected moves into engagement with the contact disk 28, the lamp is directly connected to the battery and remains so during the continued rotation of the contact member. Hence, with this arrangement, the lamp will glow at full intensity so long as the switch is "on," regardless of the position of the brush on the resistance wire.

In order to keep the resistance wire cool and dissipate heat generated by it, the base is provided with apertures 72 allowing the air to pass upwardly through the convolutions of the coils, and the casing is provided with openings 73 formed between the arms 55. Cross ventilation is, therefore, provided in the casing so that the air sweeps over the upper portion of the coils and into the space between the base and the casing to keep the same cool.

It will be noted that the pressure of the contact 46 which tends to depress the contact member and produce friction between the latter and the insulating block 38 is counteracted by the pressure of the contact 46 and the brush 49 which tends to lift the contact member.

Variations and modifications may be made within the scope of this invention and portions of the improvements may be used without others.

Having thus described the invention, what is claimed as new and for which it is desired to obtain Letters-Patent is:

1. A combined rheostat and switch comprising a base; an enclosing casing over the base; a contact member rotatably mounted on the base and united thereto against removal therefrom; a resistance coil mounted on the base and engaged by said contact member; an operating device mounted on said base for rotation coaxial with the contact member when said base and casing are superposed; arms on said operating device; a pair of companion arms on said contact member; and an apertured block of insulating material receiving in its aperture one set of said arms and on its periphery the other set of arms, and constituting an insulating coupling between said contact member and said driving member.

2. In a combined rheostat and switch, a base; a resistance element carried thereby; a contact plate carried by the base; two wire terminal pieces electrically connected to said resistance element and contact plate respectively; a pilot light; and a contact member rotatably mounted on the base and having a brush slidable onto and upon the resistance element, a contact connected to one contact of the pilot light, and a contact to engage and slide upon and disengage said contact plate, the latter having an interruption positoned to cause the movable contact for the contact plate to disengage the latter and open the electrical circuit between the contact member and the contact plate and pilot light contact when the brush passes the resistance element and its wire terminal piece.

3. In a combined rheostat and switch, a base; a resistance element carried thereby; a contact plate carried by the base; two wire terminal pieces electrically connected to said resistance element and contact plate respectively, said resistance element and contact plate being spaced from one another whereby a gap is formed in the circuit of the device with which the switch is to be used; and a bridging contact member of conducting material rotatably mounted on the base and having a brush slidable onto and upon the resistance element, and a contact to engage and slide upon said contact plate to close the gap between the resistance element and contact plate, the latter having an interruption positioned to cause the movable contact for the contact plate to disengage the latter and open the electrical circuit between the bridging contact member and the contact plate when the brush passes the resistance element and its wire terminal piece.

4. In a combined rheostat and switch, a base; a resistance element carried thereby; a contact plate carried by the base; two wire terminal pieces electrically connected to said resistance element and contact plate respectively, said resistance element and contact plate being spaced from one another whereby a gap is formed in the circuit of the device with which the switch is to be used; and a bridging contact member rotatably mounted on the base and having a brush slidable onto and upon the resistance element, and a contact to engage and slide upon said contact plate to close the gap between the resistance element and contact plate, the latter having an interruption positioned to cause the movable contact for the contact plate to disengage the latter and open the electrical circuit between the bridging contact member and the contact plate when the brush passes the resistance element and its wire terminal piece, said resistance element, contact plate and bridging contact member being arcuate and concentrically disposed and said contact member being formed on a single piece having the brush and contact individually yieldingly urged toward the resistance element and contact plate respectively.

5. In a combined rheostat and switch, a base; a resistance element carried thereby; a contact plate carried by the base; two wire terminal pieces electrically connected to said resistance element and contact plate respectively; a pilot light; and a contact member rotatably mounted on the base and having a brush slidable onto and upon the resistance element, a contact connected to one contact of the pilot light, and a contact to engage and slide upon and disengage said contact plate, the latter having an interruption positioned to cause the movable contact for the contact plate to disengage the latter and open the electrical circuit between the contact member and the contact plate and pilot light contact when the brush passes the resistance element and its wire terminal piece, said resistance element, contact plate, pilot light and contact member being concentrically disposed and said contact member being formed of a single piece having the brush and two contact members each individually yieldingly urged toward the resistance element, the contact plate and the pilot light contact respectively.

6. A multifunction contact member for rheostats and the like, comprising a central annular portion having a bearing aperture; a resistance-engaging brush extending radially therefrom connected to the annular portion by an arcuate portion separated for the most part from the latter by an arcuate slit; and a contact having an arcuate portion separate for the most part from the annular portion by an arcuate slit, said brush and contact being individually yieldable.

7. A multifunction contact member for rheostats and the like, comprising a central annular portion having a bearing aperture; a resistance-engaging brush extending radially therefrom connected to the annular portion by an arcuate portion separated for the most part from the latter by an arcuate slit; a contact having an arcuate portion separate for the most part from the annular portion by an arcuate slit; and a lamp engaging contact having an arm extending radially from the annular portion and a reverse bend to extend back on itself and overlie said bearing portion to engage a lamp arranged concentric with and spaced from the contact member, said brush and first contact, because of said arcuate slits and said lamp contact because of reverse bend being individually yieldable.

8. In a combined rheostat and switch device, a housing comprising a base of insulating material and a member attached to said base and having an aperture therein; a hollow operating member projecting through and movable in said aperture; a pair of connecting terminals mounted on the base; a resistance element mounted on the base and connected to one of the terminals; a contact plate mounted on the base and uniformly spaced from the resistance element and connected to the other terminal whereby a gap is formed in the circuit of the device with which the switch is to be used; a bridging element operatively associated with the operating member for movement thereby and cooperating with the contact plate and resistance element for closing the gap therebetween and connect a variable portion of the resistance element into said circuit including said pair of connection terminals; a lamp mounted in the operating member; and means for electrically connecting one terminal of said lamp with the bridging member whereby when the bridging member closes the gap between the resistance element and contact plate it also closes a circuit through said lamp.

9. In a combined rheostat and switch device, a housing comprising a base of insulating material and a metal member attached to said base and having an aperture opposite said base; a hollow operating member projecting through and rotatable in said aperture; a pair of contacts mounted on the base; a curved resistance element mounted on the base and connected to one of said contacts; a curved contact plate mounted on the base concentric with but spaced from the resistance element and connected with the other contact of the pair of contacts whereby a gap is formed in the circuit of the device with which the switch is to be used; a bridging element connected to the operating member for rotation therewith and contacting the contact plate and resistance element for closing the gap therebetween upon rotation of the operating member; a lamp mounted within the operating member; means electrically connecting one terminal of said lamp with said metal housing member; and means electrically connecting the other terminal of said lamp with the bridging element whereby when the gap is closed between the resistance element and contact plate the circuit will also be closed through the lamp.

10. In a combined rheostat and switch device, a housing comprising a base of insulating material and a member attached to said base and having an aperture therein; a hollow operating member projecting through and movable in said aperture; a pair of connection terminals mounted on the base; a resistance element mounted on the base and connected to one of the terminals; a contact plate mounted on the base and uniformly spaced from the resistance element and connected to the other terminal whereby a gap is formed in the circuit of the device with which the switch is to be used; a bridging element operatively associated with the operating member for movement thereby and contacting the contact plate and resistance element for closing the gap therebetween and connect a variable portion of the resistance element into said circuit including said pair of connection terminals; a lamp mounted in the operating member; and means for electrically connecting one terminal of said lamp with the bridging member whereby when the bridging member closes the circuit between the resistance element and contact plate it also closes a circuit through said lamp, said bridging element being movable by the operating member to a position in which the bridging relation between the resistance element and contact plate is broken.

11. In a combined rheostat and switch device, a housing comprising a base of insulating material and a metal member provided with a plurality of vent openings attached to said base and having an aperture opposite said base; a hollow operating member projecting through and movable in said aperture; a pair of connection terminals mounted on the base; a resistance element mounted on the base and connected to one of the terminals; a contact plate mounted on the base and uniformly spaced from the resistance element and connected to the other terminal whereby a gap is formed in the circuit of the device with which the switch is to be used; a bridging element operatively associated with the operating member for movement thereby and contacting the contact plate and resistance element for closing the gap therebetween and connect a variable portion of the resistance element into said circuit including said pair of connection terminals; a lamp mounted in the operating member; and means for electrically connecting one terminal of said lamp with the bridging member whereby when the bridging member closes the gap between the resistance element and contact plate it also closes a circuit through said lamp.

12. In a combined rheostat and switch device, a hollow manually operable member; an electric lamp mounted in the hollow of said member; a stationary housing including a base of insulating material supporting said member and from which said member projects; an elongate resistance element mounted on the base; a contact plate mounted on the base and uniformly spaced from the resistance element whereby a gap is formed in the circuit of the device with which the switch is to be used; a pair of connection terminals extending through the base and connected to the resistance element and to the contact plate respectively; and a bridging element operable by movement of said member for closing the gap between the resistance element and the contact plate to connect said lamp and a variable portion of said resistance element into said circuit including the pair of connection terminals.

13. In a combined rheostat and switch device, a hollow manually rotatable member; an electric lamp mounted in the hollow of said member; a stationary housing including a base of insulating material supporting said member and from which said member projects; an elongate resistance element mounted on the base and arranged in a circular arc concentric with the axis of rotation of said member; a contact plate mounted on the base and spaced from the resistance element but arranged in a circular arc concentric with the axis of rotation of said member whereby a gap is formed in the circuit of the device with which the switch is to be used; a pair of connection terminals extending through the base and connected to the resistance element and to the contact plate respectively; and a bridging element operable by rotation of said member for closing the gap between the resistance element and the contact plate to connect said lamp and a variable portion of said resistance element into said circuit including the pair of connection terminals.

14. In a combined rheostat and switch device, a hollow manually operable member; an electric lamp mounted in the hollow of said member; a stationary housing including a base of insulating material supporting said member and from which said member projects; an elongate resistance element mounted on the base; a contact plate mounted on the base and uniformly spaced from the resistance element whereby a gap is formed in the circuit of the device with which the switch is to be used; a pair of connection terminals extending through the base and connected one to the resistance element and the other to the contact plate; and a bridging element operable by movement of said member for closing the gap between the resistance element and the contact plate to connect said lamp and a variable portion of said resistance element into said circuit including the pair of connection terminals.

JOSEPH H. COHEN.